(12) United States Patent
VandeBeek et al.

(10) Patent No.: US 9,008,230 B2
(45) Date of Patent: Apr. 14, 2015

(54) RECEIVER AND METHOD FOR NEAR FIELD COMMUNICATION

(71) Applicant: NXP B.V., Eindhoven (NL)

(72) Inventors: Remco C. VandeBeek, Eindhoven (NL);
Massimo Ciacci, Den Bosch (NL);
Ghiath Al-kadi, Eindhoven (NL)

(73) Assignee: NXP B.V., Eindhoven (NL)

( * ) Notice: Subject to any disclaimer, the term of this patent is extended or adjusted under 35 U.S.C. 154(b) by 100 days.

(21) Appl. No.: 13/736,264

(22) Filed: Jan. 8, 2013

(65) Prior Publication Data

US 2014/0192931 A1 Jul. 10, 2014

(51) Int. Cl.
*H03D 1/24* (2006.01)
*H04L 27/06* (2006.01)
*H04B 5/00* (2006.01)

(52) U.S. Cl.
CPC .............. *H04L 27/06* (2013.01); *H04B 5/0031* (2013.01); *H04B 5/0075* (2013.01)

(58) Field of Classification Search
USPC .......................... 375/320, 316, 219, 300, 353
See application file for complete search history.

(56) References Cited

U.S. PATENT DOCUMENTS

| 5,940,447 A * | 8/1999 | Connell et al. ................. 375/316 |
| 2004/0179510 A1 * | 9/2004 | Kuffner et al. ................. 370/350 |
| 2007/0075143 A1 * | 4/2007 | Higashi ......................... 235/451 |
| 2009/0033462 A1 * | 2/2009 | Kitayoshi et al. ............. 340/10.1 |
| 2009/0046809 A1 * | 2/2009 | Meltzer ......................... 375/308 |
| 2012/0083205 A1 | 4/2012 | Marcu et al. |
| 2012/0183100 A1 * | 7/2012 | Luzzi et al. ................... 375/320 |

FOREIGN PATENT DOCUMENTS

WO 2006/008685 A1 1/2006

OTHER PUBLICATIONS

Extended European Search Report for Patent Appln. No. 13199914.6 (May 21, 2014).
ISO/IEC 14443-2:2001 Identification cards—Contactless integrated circuit(s) cards—Proximity cards—Part 2: Radio frequency power and signal interface, 2001.
"RFID Handbook: Fundamentals and Applications in Contactless Smart Cards, Radio Frequency Identification and Near-Field Communication—2nd Ed.", Klaus Finkenzeller, ISBN: 0-470-84402-7, pp. 278, 2003.
M. van Elzakker, E. van Tuijl, P. Geraedts, D. Schinkel, E. Klumperink, B. Nauta, "A 1.9μW 4.4fJ/Conversion-step 10b 1MS/s Charge-Redistribution ADC," in ISSCC Dig. Tech. Papers, Feb. 2008.

* cited by examiner

*Primary Examiner* — Kenneth Lam (57) ABSTRACT

In one embodiment, an apparatus is provided that includes a first circuit configured and arranged to provide a modulated carrier signal in response to a signal provided from the antenna. The modulated carrier signal conveys data using peaks or amplitudes of the carrier signal. A second circuit is configured to rectify the modulated carrier signal and integrate the rectified signal in response to a first clock signal. A third circuit is coupled to an output of the second circuit and is configured to sample the integrated signal values and provide therefrom a sample-based approximation of the modulated carrier signal.

20 Claims, 7 Drawing Sheets

RECEIVER AND METHOD FOR NEAR FIELD COMMUNICATION

Aspects of various embodiments are directed to near field communication.

Near field communication (NFC) is widely used in a variety of applications to provide radio communications between devices including, e.g., smartphones and similar devices including Radio Frequency Identification (RFID), by touching them together or bringing them into close proximity. Applications include, among others, contactless transactions, data exchange, and simplified setup of more complex communications such as WIFI. In some applications, smart cards and/or RFID tags are used in endeavors such as transport (e.g., ticketing, road tolling, baggage tagging), finance (e.g., debit and credit cards, electronic purses, merchant cards), communications (e.g., SIM cards for GSM phone), and tracking (e.g., access control, inventory management, asset tracking).

ISO/IEC 14443 is an industry standard for contactless smart cards, and the communication protocols associated therewith. ISO/IEC 14443-compliant products provide RF-communication technology for transmitting data between a smart card chip and a reader device. For example, in electronic ticketing for public transport, travelers can wave a smart card over a reader at the turnstiles or entry point, benefiting from improved convenience and speed in the ticketing process. Such products can be important to individual mobility, and can support multiple applications such as road tolling, airline ticketing, and access control.

A contactless smart card operating according to ISO/IEC 14443 receives data from the card reader by the latter modulating the magnetic field to transmit an amplitude-shift keying (ASK) modulated signal. For instance, the modulated magnetic field may induce currents/voltage in a coil antenna connected to the contactless smart card. ASK modulation encodes data in the amplitude of peaks of a carrier signal. The smart card chip includes logic for demodulation of the ASK-modulated signal in order to retrieve the information bit content. For instance, for low data rate applications, demodulation may be based upon peak detection using a diode-rectifier followed by a low-pass filter for anti-alias filtering of interference in a received signal. However, low-pass filtration may limit the signal bandwidth in high bit rate applications. Furthermore, such a filtered diode detector may exhibit a non-linear response (where the signal at the detector output may show fast rise times versus slow fall times). Such non-linearity can make it difficult to perform additional equalization (e.g., digital equalization to compensate for inter-symbol interference).

These and other matters have presented challenges for a variety of applications utilizing near field communication.

Aspects of the present disclosure are applicable to various communication methods, devices, and systems involving near field communication (NFC), such as smartcards. Some embodiments are directed to methods and circuits for demodulation of near field communication signals, e.g., ASK modulated signals. In some implementations, a receiver circuit samples a signal without low-pass filtration of the signal. For instance, in a contactless smartcard operating according to ISO/IEC 14443, integration may be used to sample peaks of a received ASK modulated signal. By sampling peaks of an ASK modulated signal, interference present in other parts of the signal can be avoided while preserving the ASK information.

In one embodiment, an apparatus configured for operation with an antenna is provided. The apparatus includes a first circuit configured and arranged to provide a modulated carrier signal, which conveys data using peaks or amplitudes of the carrier signal in response to a signal provided from the antenna. A second circuit is configured to rectify the modulated carrier signal and integrate the rectified signal in response to a first clock signal. For instance, in some implementations the first clock signal is generated by the first circuit from the modulated carrier signal and is configured to cause the second circuit to integrate portions of the rectified signal corresponding to peaks of the ASK modulated signal. A third circuit is coupled to an output of the second circuit and is configured to sample the integrated signal values and provide therefrom a sample-based approximation of the modulated carrier signal. For instance, the third circuit may include an analog-to-digital converter (ADC) configured to convert an analog voltage of an integrated signal to a digital value.

In another embodiment, a method is provided for processing a modulated carrier signal. Using a first circuit, a modulated carrier signal received from an antenna is provided to a second circuit. The modulated carrier signal conveys data using peaks or amplitudes of the modulated carrier signal. Using the second circuit, the modulated carrier signal is processed in response to a first clock signal. For instance, in some implementations the first circuit is used to generate the first clock signal from the modulated carrier signal, where the generated first clock signal indicates portions of the modulated carrier signal corresponding to peaks of the modulated carrier signal. Using a third circuit, the integrated signal is sampled to provide a sample-based approximation of the modulated carrier signal. In some embodiments, the third circuit includes an ADC configured to convert the integrated signal output from the second circuit to a digital value in response to a second clock signal.

The above discussion/summary is not intended to describe each embodiment or every implementation of the present disclosure. The figures and detailed description that follow also exemplify various embodiments.

Various example embodiments may be more completely understood in consideration of the following detailed description in connection with the accompanying drawings, in which.

While the specification is amenable to various modifications and alternative forms, aspects thereof have been shown by way of example in the drawings and will be described in detail. It should be understood, however, that the intention is not to limit the specification to the particular embodiments shown and/or described. On the contrary, the intention is to cover all modifications, equivalents, and alternatives falling within the spirit and scope of the specification. In addition, the term "example" as used throughout this application is only by way of illustration, and not limitation.

Various example embodiments are directed to methods and circuits for demodulation of signals in devices and systems involving near field communication (NFC), such as smartcards. While embodiments are applicable to a number of different applications using a number of different modulation techniques, for ease of explanation, examples are primarily described in the context of a contactless smartcard configured for ASK communication according to ISO/IEC 14443. However, certain embodiments are not so limited and may be applicable to other applications utilizing near field communication or utilizing other data modulation techniques that represent data by modulating peaks or amplitudes of a carrier signal (e.g., pulse amplitude modulation, on-off keying). In some implementations, data in a modulated signal may be encoded with a number of additional protocols to provide additional functionality (e.g., encryption, forward error correction, and authentication). While embodiments of the present disclosure are not necessarily so limited, various aspects of the invention may be appreciated through a discussion of related examples.

In some various example embodiments, a device (e.g., smart card) is configured to provide a sample based approximation of a modulated carrier signal (e.g., an ASK modulated signal) using signal integration. In one embodiment, the device includes a first circuit configured to provide a version of the modulated carrier signal from an antenna (e.g., an external coil antenna coupled to the smartcard chip) to a second circuit of the device for integration. The second circuit is configured integrate a version of the modulated carrier signal in response to a first clock signal. For instance, in some implementations, the first clock signal is generated from the modulated carrier signal by the first circuit and is configured to indicate portions of the modulated carrier signal that correspond to peaks of the modulated carrier signal. In some implementations, the first clock causes the second circuit to integrate portions of an ASK modulated carrier signal containing peaks. By sampling peaks of an ASK modulated signal, interference present in other parts of the signal can be avoided while preserving the ASK information. The device includes a third circuit configured to sample the integrated values determined by the second circuit. For instance, in one implementation, the third circuit may include an ADC configured to convert analog samples of the integrated signal provided from the second circuit to digital values.

In response to the first clock signal, the second circuit integrates a portion of the modulated carrier signal corresponding to a peak. In some implementations, the second circuit integrates the modulated carrier signal that is received from the antenna. In some implementations, the second circuit integrates a version of the modulated carrier signal (e.g., a rectified version of the modulated carrier signal).

In some embodiments, the second circuit is configured to provide a signal dump operation in response to a second clock signal. For instance, in one implementation, the third clock signal is configured to cause the second circuit to perform a dump operation after an amount of time sufficient to complete integration of a cycle of the carrier signal and sample the integrated value. In one implementation, the signal dump operation includes resetting of the integrated signal. In another implementation, the signal dump operation includes at least partially erasing signal buildup within the second circuit due to the integration performed by the second circuit.

A third circuit is coupled to an output of the second circuit and is configured to sample the integrated signal values and provide therefrom a sample-based approximation of the modulated carrier signal. For instance, the third circuit may include an ADC configured to convert a voltage of an integrated signal to a digital value. In some embodiments, the third circuit is configured to sample values of the integrated signal in response to a third clock signal. For instance, in some implementations the third clock signal is configured to cause the third circuit to delay sampling of the integrated signal by the third circuit until integration by the second circuit has completed.

In some embodiments, the first circuit is configured to generate the first clock signal from the modulated carrier signal. In some implementations, the first circuit is configured to generate the first clock signal without performing phase locked loop (PLL) or delay locked loop (DLL) operations on the modulated carrier signal. For instance, in one implementation the first circuit includes a frequency divider configured to reduce frequency of the modulated carrier signal to produce the first clock signal. In some embodiments, the second and/or third clock signals are derived from the first clock signal. For instance, in one implementation the second clock signal may be generated by phase shifting the first clock signal. In some embodiments, the second and/or third clock signals are independently generated and have respective frequencies that are locked to a frequency of the first clock signal.

In some embodiments, a smart card is provided that includes the first, second, and third circuits described above. In one embodiment, the smart card also includes the antenna from which the modulated carrier signal is received by the first circuit. In some embodiments, the smart card further includes signal processing logic for processing analog/digital values output from the third circuit. For instance, in one embodiment, the smart card includes a digital signal processor configured to perform equalization on digital values output from the third circuit.

In another embodiment, a method is provided for processing a modulated carrier signal. Using a first circuit, a modulated carrier signal received from an antenna is provided to a second circuit. The modulated carrier signal conveys data using peaks or amplitudes of the carrier signal. Using the second circuit, the modulated carrier signal is processed in response to a first clock signal. In some implementations the first circuit is used to generate the first clock signal from the modulated carrier signal, where the generated first clock signal indicates portions of the modulated carrier signal corresponding to peaks of the modulated carrier signal. Using a third circuit, the integrated signal is sampled to provide a sample-based approximation of the modulated carrier signal. In some embodiments, the third circuit includes an ADC configured to convert the integrated signal output from the second circuit to digital values in response to a respective clock signal.

Figure 1:
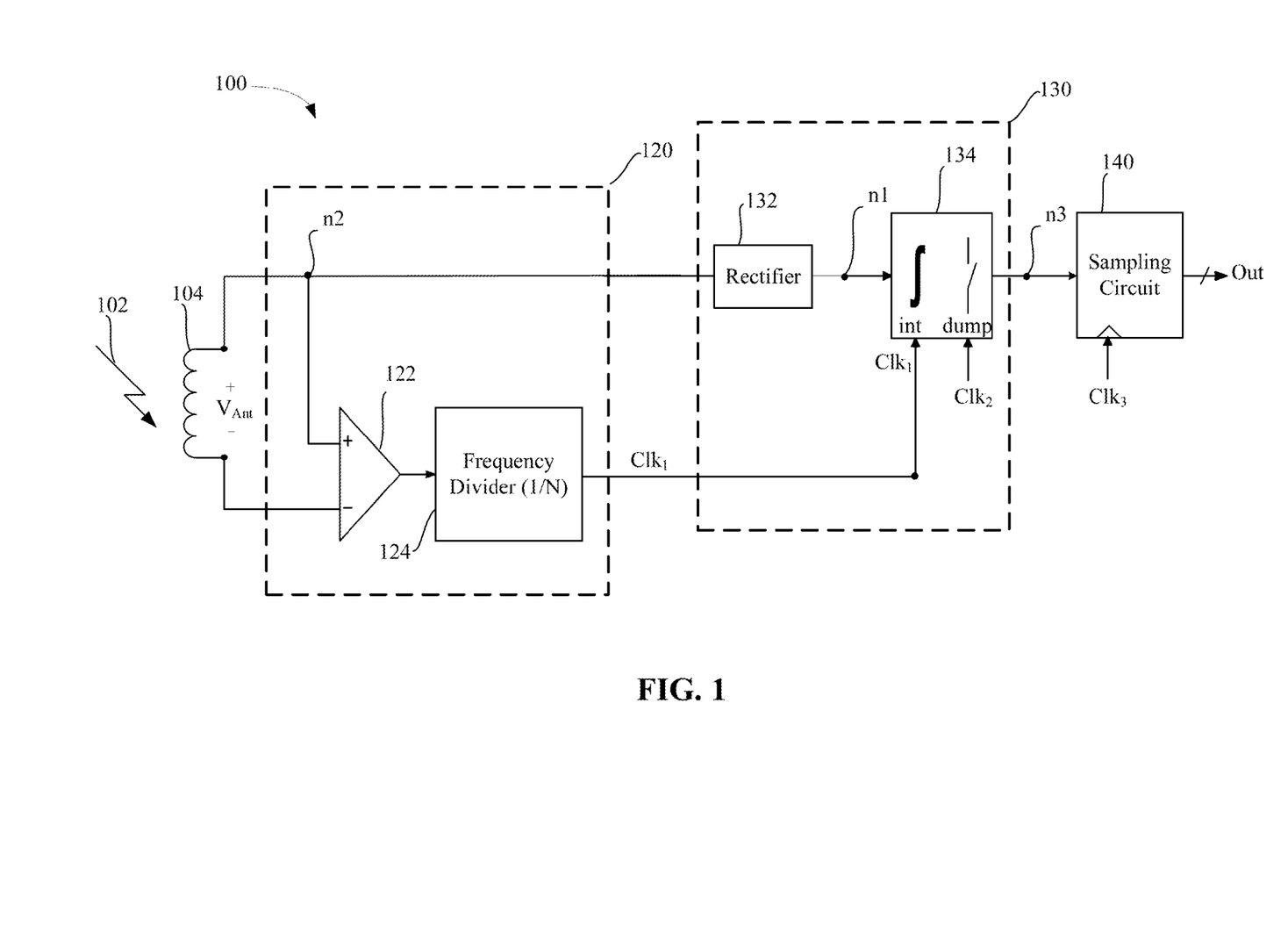
FIG. 1 shows a block diagram of a receiver circuit consistent with various aspects of the instant specification.

Turning now to the figures, FIG. 1 shows a block diagram of a receiver consistent with the instant specification. Receiver 100 includes an inductive loop antenna 104 that is responsive to a magnetic field generated by a transmitter (e.g., a smartcard reader) via mutual induction. In response to a modulated carrier signal 102 that is transmitted to the receiver 100, via mutual induction, the inductive loop antenna 104 generates a modulated carrier signal voltage ($V_{Ant}$)

A first circuit 120 is configured to generate a first clock signal ($Clk_1$) from the modulated carrier signal and provide a version of the modulated carrier signal to a second circuit 130. In this example, the first circuit includes a differentialto-single-ended buffer 122 configured to create a rail-to-rail clock signal from the modulated carrier signal received by the antenna. The first circuit includes a frequency divider 124 (e.g., a static, flip-flop based frequency divider) that is driven by the output of the differential to single-ended buffer. The frequency divider reduces the frequency of the rail-to-rail clock signal from the buffer 122 by a factor of N. Transitions of the state of the first clock signal output by the frequency divider coincide with zero crossings of the modulated carrier signal.

The second circuit 130 is configured to integrate a version of the modulated carrier signal in response to the first clock signal $Clk_1$. In the implementation shown in FIG. 1, the second circuit 130 includes a rectifier circuit 132 configured to provide a rectified version of the modulated carrier signal at node n1'. In response to the first clock signal, an integrate-and-dump circuit 134 integrates the rectified signal (e.g., node n1). However, in some implementations, a rectified version of modulated carrier signal that is integrated may be provided by other circuits (e.g., a passive power supply circuit). Further, in some embodiments, the integrate-and-dump circuit 134 is configured to integrate the modulated carrier signal received (e.g., node n2), without being rectified by rectifier 132.

The integrate-and-dump circuit 134 enables integration of the signal provided to its input (e.g., the rectified signal) in response to a rising edge of the first clock signal $Clk_1$ and provides the integrated signal at an output. In response to a falling edge of $Clk_1$, the integrate-and-dump circuit 134 disables integration. As a result, the integrated signal provided at the output is maintained. The integrate-and-dump circuit 134 is configured to perform a dump operation (e.g., a reset) of the integrated signal in response to a second clock signal $Clk_2$.

A sampling circuit 140 is coupled to the output of the integrate-and-dump circuit 134 (e.g., node n3). The sampling circuit 140 is configured to sample values of the integrated signal in response to a third clock signal $Clk_3$ and provide a sample-based approximation of the modulated carrier signal. For instance, in some embodiments, the sampling circuit 140 includes an ADC configured to convert an analog voltage of the output of the second circuit (e.g., the integrated signal) to a digital value.

Figure 2:
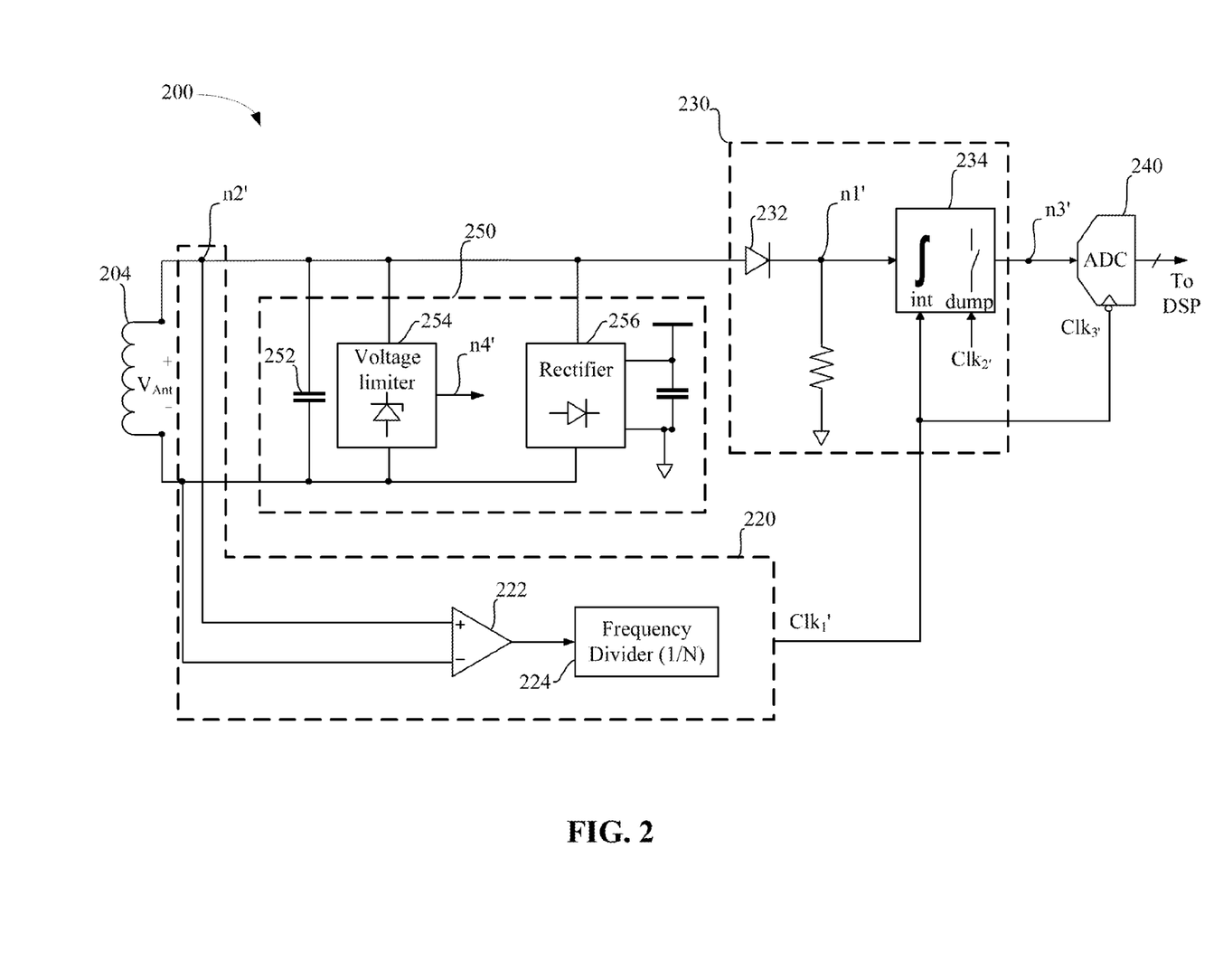
FIG. 2 shows a block diagram of a smart card receiver circuit consistent with various aspects of the instant specification.

In some embodiments, a receiver circuit consistent with various aspects of the specification is implemented in a smart card chip. FIG. 2 shows a block diagram of a smart card receiver circuit consistent with various aspects of the instant specification. Similar to the device described with reference to FIG. 1, the smart card receiver circuit 200 includes circuits configured to provide a sample-based approximation of the modulated carrier signal ($V_{Ant}$) received from an antenna 204. For instance, the smart card receiver circuit 200 includes a first circuit 220 configured to generate a first clock signal ($Clk_1'$) from the modulated carrier signal and a second circuit 230 configured to integrate a version of the modulated carrier signal in response to $Clk_1'$. The second circuit is further configured to perform a dump operation (e.g., reset) of the integrated signal in response to a second clock signal ($Clk_2'$). The smart card receiver circuit 200 also includes a sampling circuit 240 configured to sample values of the integrated signal in response to a third clock signal ($Clk_3'$). In some implementations, the antenna 204 is integrated with receiver circuit 200 in a smart card chip. In some other implementations, the antenna 204 is an external antenna connected to the smart card chip.

In some embodiments, the smart card receiver circuit 200 includes a passive power supply (e.g., 250) configured to generate a supply voltage from the modulated carrier signal that may be used to power one or more circuits of the smart card receiver circuit 200. In the implementation shown in FIG. 2, passive power supply 250 includes a capacitor 252, a voltage limiter 254, and a rectifier 256. The rectifier 256 converts the modulated carrier signal from an AC voltage to a DC voltage that may be used as a supply voltage to power various circuits of the smart card receiver circuit 200. The voltage limiter 254 is configured to prevent on-chip voltages (e.g., transient voltages) from exceeding a threshold that may damage circuitry of the smart card receiver circuit 200.

For ease of explanation, operation of the first circuit 220, the second circuit 230, and the sampling circuit 240 in FIG. 2 are discussed with reference to the example waveforms shown in FIG. 3. In the implementation shown in FIG. 2, the first circuit 220 includes a differential to single ended buffer 222 configured to create a rail-to-rail clock signal from the modulated carrier signal ($V_{Ant}$) received from the antenna 204. For instance, the buffer 222, may convert the example waveform 302 of the modulated carrier signal $V_{Ant}$ shown in FIG. 3 to a clock signal of the same frequency (not shown). The first circuit includes a frequency divider 224 (e.g., a static, flip-flop based frequency divider) that is driven by the rail-to-rail clock signal output from the buffer 222. The frequency divider 224 reduces the frequency of the rail-to-rail clock signal to produce the first clock signal $Clk_1'$. For instance, in FIG. 3, the frequency of the waveform modulated carrier signal is divided by 4 to produce the example waveform 306 ($Clk_1'$).

The second circuit 230 is configured to integrate a version of the modulated carrier signal (waveform 302) in response to $Clk_1'$ (waveform 306). In the implementation shown in FIG. 2, the second circuit 230 includes a rectifier circuit 232 configured to provide a rectified version of the modulated carrier signal at node n1' (e.g., waveform 304). In response to $Clk_1'$ (e.g., waveform 306), the integrate-and-dump circuit 234 integrates the rectified signal (e.g., waveform 304) to produce an integrated signal at node n3' (e.g., waveform 310). For instance, at times t2 and t6 in FIG. 3, $Clk_1'$ (e.g., waveform 306) exhibits a rising edge. As a result, the modulated carrier signal (e.g., waveform 302) is integrated to produce waveform 310. At times t3 and t7, $Clk_1'$ (e.g., waveform 306) exhibits a falling edge. In response, integration of the modulated carrier signal (e.g., waveform 302) is halted by the integrate-and-dump circuit 234 and the integrated value is maintained.

The sampling circuit 240 is coupled to the output of the integrate-and-dump circuit 234 and is configured to sample values of the integrated signal (e.g., waveform 310) in response to a third clock signal $Clk_3'$ to provide a sample-based approximation of the modulated carrier signal. For instance, in the implementation shown in FIG. 2, sampling circuit 240 is an ADC configured to convert an analog voltage of the output of the second circuit (e.g., the integrated signal) to a digital value. The third clock signal $Clk_3'$ is configured to cause the sampling circuit to sample the integrated signal after integration has completed (e.g., while the integrated value is held). For instance, in the implementation shown in FIG. 2, the sampling circuit 240 is configured to sample values in response to an inverse of the first clock signal $Clk_1'$ (e.g., falling edge of $Clk_1'$.

Because the integrated value is held after integration is completed, the sampling circuit can use the integrated value to sample an approximate amplitude of the modulated carrier signal (e.g., waveform 302) at times at which an amplitude of the modulated carrier signal could not be determined by direct sampling. For instance, the integrated value (waveform 310) may be sampled at times t3 and t7, where the modulated carrier signal (e.g. waveform 302) is at zero-crossing points. Because, the integrated value may be sampled at times corresponding to zero-crossing points of the modulated carrier signal, the clock signals (e.g., $Clk_1'$, $Clk_2'$, and $Clk_3'$) are not required to be phase locked to the modulated carrier signal. Accordingly, as shown in FIG. 2, the first circuit can generate the first clock signal without use of a phase-locked loop.

As indicated above, the integrate-and-dump circuit 134 is also configured to perform a dump operation (e.g., a reset) of the integrated signal in response to a second clock signal $Clk_2'$. The dump operation resets the integrated signal to prepare the integrate-and-dump circuit for integration of another sample of the modulated carrier signal. For instance, as shown in FIG. 3, the integrated signal (e.g., waveform 310) is reset in response to a rising edge of $Clk_2'$ (waveform 308). The second clock signal is configured to cause the integrate-and-dump circuit to reset the integrated signal after a time sufficient to allow sampling of the integrated signal to be completed. The second clock signal $Clk_2'$ may be independently generated or may be derived from the first clock signal $Clk_1'$. In the example shown in FIG. 3, $Clk_1'$ (waveform 306) is phased shifted to provide the second clock signal $Clk_2'$ (waveform 308).

In the implementation described with reference to FIGS. 2 and 3 the integrate-and-dump circuit 234 is configured to integrate a rectified version of modulated carrier signal provided by rectifier diode 232 at node n1' (e.g., waveform 304). However, embodiments are not so limited. In some embodiments, integrate-and-dump circuit 234 may be arranged to integrate a rectified version of the modulated carrier signals provided by another circuit. For instance, in one embodiment, the integrate-and-dump circuit 234 is arranged to integrate a rectified signal provided by voltage limiter at node n4'. Further, in some embodiments, the integrate-and-dump circuit 234 is configured to integrate the modulated carrier signal directly (e.g., node n2') without being rectified.

Figure 3:
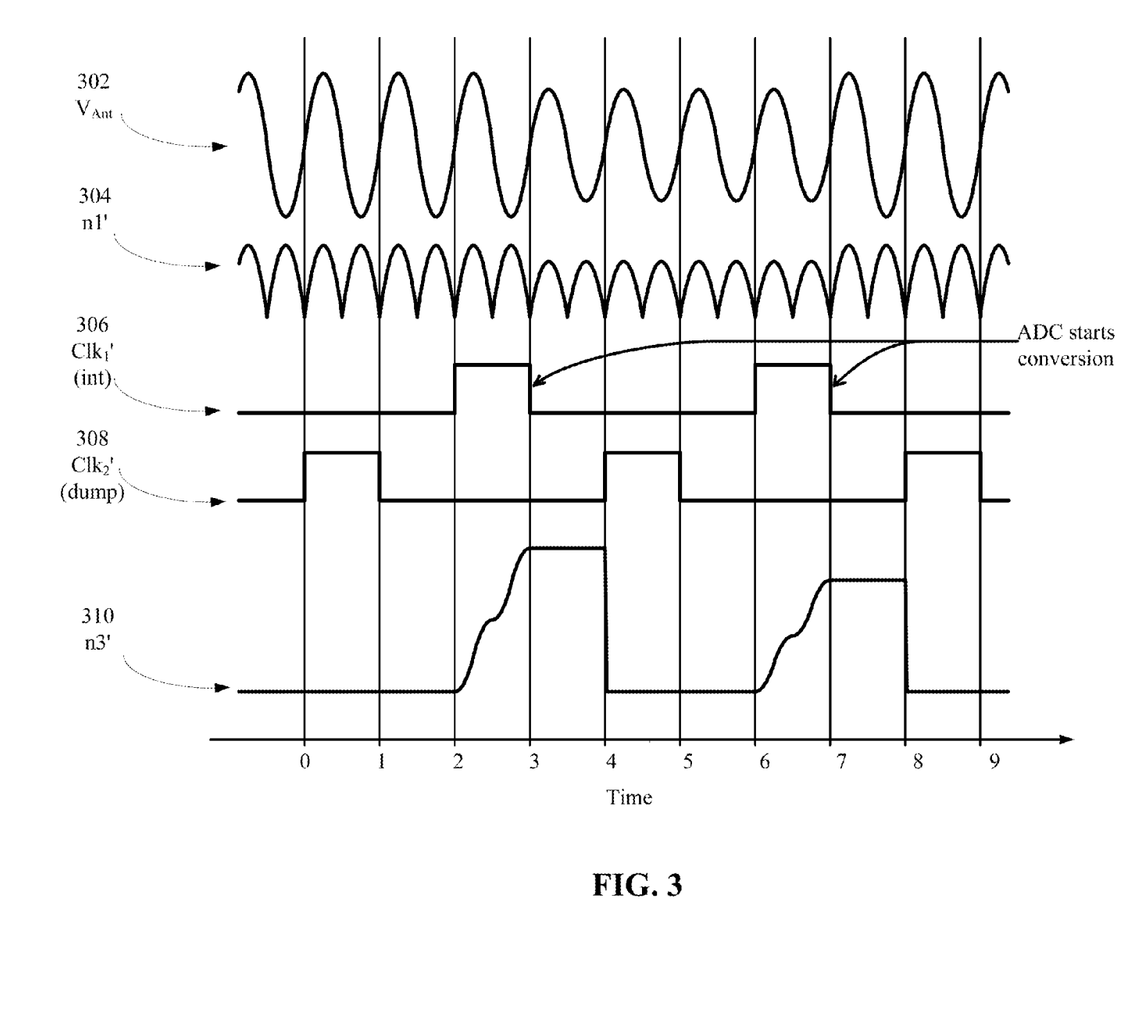
FIG. 3 illustrates various intermediate waveforms utilized in the sampling of a received signal using an integrate-and-dump process consistent with various aspects of the instant specification.

In the example shown in FIG. 3, the first clock signal ($Clk_1'$) is generated by dividing frequency of the rail-to-rail clock by a fixed ratio (i.e., N=4). However, in some embodiments, the frequency divider 224 may be configurable to adjust the frequency divider ratio N. For instance, in some embodiments, the smart card receiver circuit 200 may include a control circuit (not shown) configured to adjust the frequency divider ratio (N) for various purposes. For example, the control circuit may adjust the frequency divider ratio (N) to scale the sample frequency with a system data rate. As another example, the control circuit may adjust the frequency divider ratio (N) to control the exact instant where the input signal is sampled.

Figure 4:
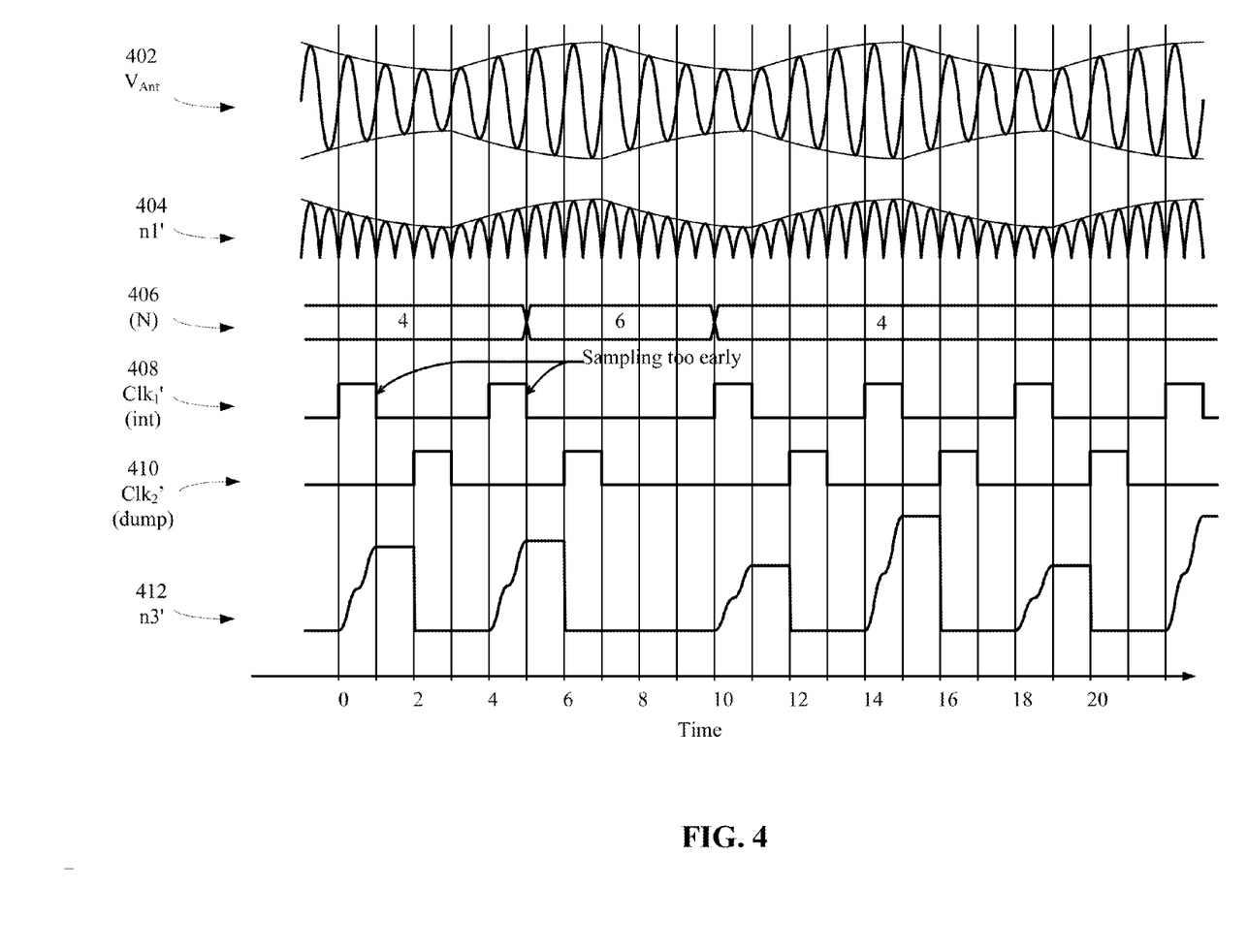
FIG. 4 illustrates adjustment of a frequency divider ratio to control sampling of a modulated carrier signal consistent with various aspects of the instant specification.

FIG. 4 illustrates adjustment of a frequency divider ratio to control sampling of a modulated carrier signal consistent with various aspects of the instant specification. Similar to FIG. 3, FIG. 4 shows example waveforms for various signals and nodes referenced in FIG. 2 (e.g., $V_{Ant}$, n1', $Clk_1'$, n3', and $Clk_2'$). In the example shown in FIG. 4, clock signals $Clk_1'$ (waveform 408) and $Clk_2'$ (waveform 410) are generated from the modulated carrier signal $V_{Ant}$ (waveform 402), by the first circuit 220 in FIG. 2, using a variable frequency divider ratio N (waveform 406). As described with reference to FIG. 3, in response to $Clk_1'$ (waveform 408) and $Clk_2'$ (waveform 410) rectified signal n1' (waveform 404) is integrated and reset as shown in waveform 412.

From time t0 to t5 in FIG. 4, clock signals $Clk_1'$ and $Clk_2'$ are generated using a frequency divider ratio N=4. In this example, the modulated carrier signal $V_{Ant}$ (waveform 402) is sampled at time t0 and t4, which is too early and does not capture minimum or maximum amplitudes of $V_{Ant}$. As a result, due to the bandpass limited nature of the channel that causes slow transitions of the signal envelope, it may be difficult to discriminate levels at the ADC input. To adjust the points at which $V_{Ant}$ is sampled, the frequency divider ratio is increased to N=6 at time t5 for one input cycle. This shifts the point at which the modulated carrier signal is sampled by one or more cycles of the carrier signal. As a result, the $V_{Ant}$ is next sampled at minimum amplitude (e.g., time t10). Thereafter, the frequency divider ratio is returned to N=4, and sampling is performed at maximum and minimum amplitude points. In this manner, sampling points can be adjusted to capture more distinct values for sampling to the ADC.

Figure 5:
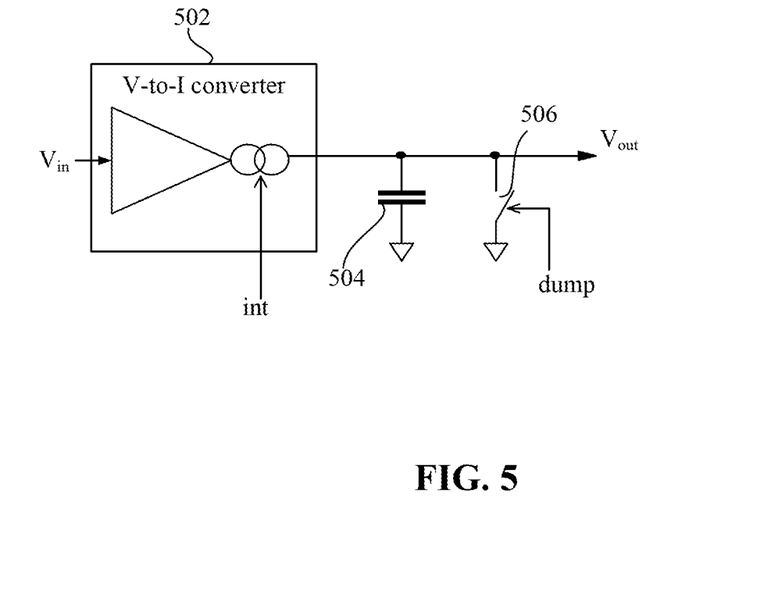
FIG. 5 shows an integrate-and-dump circuit that may be used for integration of a signal, consistent with various aspects of the instant specification.

Various circuit arrangements may be used to implement the various circuits described herein. For instance, various circuits may be used to perform integration of a signal. FIG. 5 shows an integrate-and-dump circuit that may be used for integration of a signal, consistent with various embodiments of the instant specification. In the implementation shown in FIG. 5, a voltage to be integrated ($V_{in}$) is applied to a voltage-to-current converter 502 (V-to-I converter). In response to an enable signal (Int), the resulting current is integrated in a capacitor 504 to provide an output voltage ($V_{out}$) that is proportional to the integral of the V-to-I converter input voltage. A switch 506 is configured to dump the charge from the capacitor 504 to a ground voltage in response to a dump enable signal (dump) and, thus, reset the integrator state.

Figure 6:
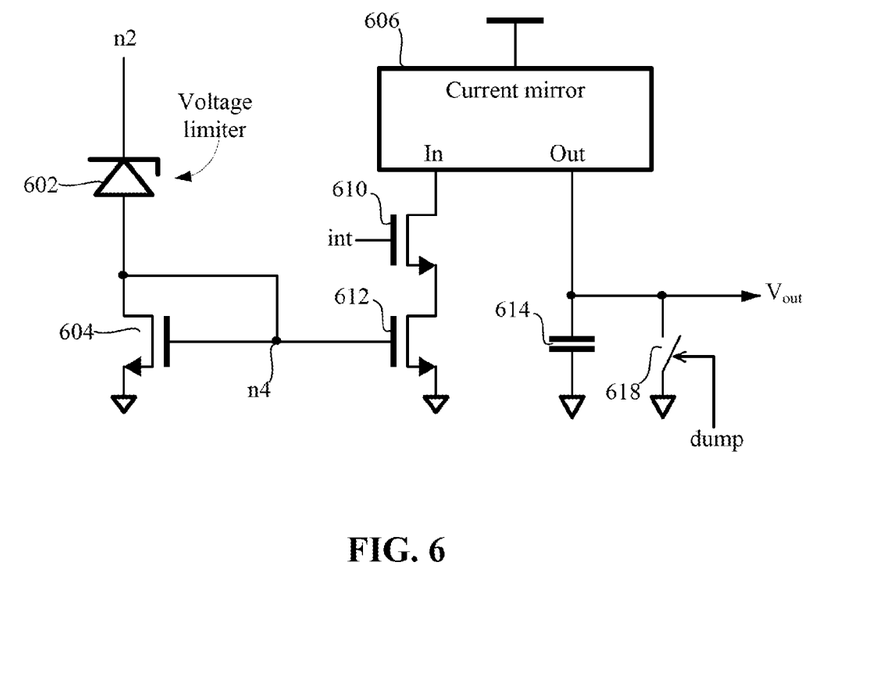
FIG. 6 shows another integrate-and-dump circuit that may be used for integration of a signal, consistent with various aspects of the instant specification.

FIG. 6 shows another integrate-and-dump circuit that may be used for integration of a signal, consistent with various embodiments of the instant specification. In the implementation shown in FIG. 6, current through the voltage limiter 602 (e.g., through voltage limiter at 254 in FIG. 2) is integrated. Although the voltage limiter 602 is depicted as a Zener diode, the voltage limiter may be implemented using other circuitry (e.g., a circuit that exhibits behavior similar to a Zener diode). Transistors 604 and 612 are arranged to limit current through transistor 612 to a current passed by the voltage limiter 602. Current through transistor 612 is selectably enabled/disabled, in response to enable signal (Int), by transistor 610. Current through transistors 610 and 612 is mirrored by current mirror 606. The mirror current is integrated by capacitor 614. The capacitor voltage is provided to the output ($V_{out}$). Switch 618 is configured to dump the charge from the capacitor 614 to a ground voltage in response to a dump enable signal (dump) and, thus, reset the integrator state.

Figure 7:
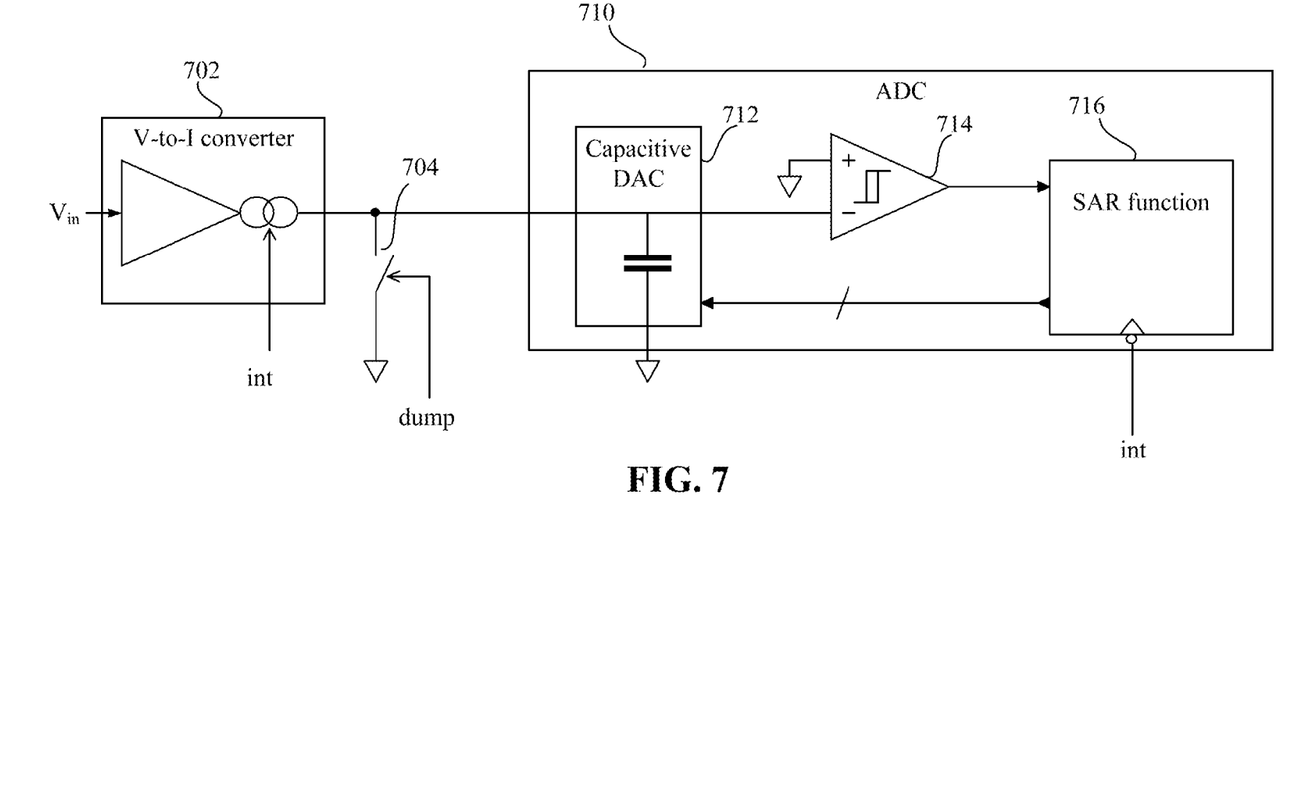
FIG. 7 shows another integrate-and-dump circuit and analog-to-digital converter (ADC) circuit consistent with various aspects of the instant specification.

FIG. 7 shows another integrate-and-dump circuit and ADC consistent with various embodiments of the instant specification. Similar to the implementation shown in FIG. 5, a voltage to be integrated ($V_{In}$) is applied to a V-to-I converter 702. In response to an enable signal (int), the resulting current is output and integrated in a capacitor that is included in capacitive digital-to-analog converter (DAC) 712. Switch 704 is configured to dump the charge from the capacitor to a ground voltage in response to a dump enable signal (dump) and, thus, reset the integrator state. In this implementation, rather than using a dedicated capacitor for the integration, a capacitor array of a capacitive DAC 712 is used, that is included in ADC circuit 710. After integration is completed, the capacitive DAC 712 has a voltage proportional to the integral of the V-to-I converter input voltage. The ADC 710 performs several comparisons using comparator 714 according to a successive approximation algorithm 716 to determine the integrated signal charge stored in the capacitive DAC 712.

Based upon the above discussion and illustrations, those skilled in the art will readily recognize that various modifications and changes may be made to the various embodiments without strictly following the exemplary embodiments and applications illustrated and described herein. For example, as indicated above, various versions of a modulated carrier signal may be integrated in a process of sampling the modulated carrier signal. Such modifications do not depart from the true spirit and scope of various aspects of the invention, including aspects set forth in the claims.

What is claimed is:

1. An apparatus for operating with an antenna, comprising:
   a first circuit configured and arranged to provide a modulated carrier signal, conveying data using peaks or amplitudes of the carrier signal, in response to a signal provided from the antenna;
   a second circuit coupled to an output of the first circuit and configured and arranged to process the modulated carrier signal, in response to a first clock signal, by providing a rectified version of the modulated carrier signal and by performing an integration of the rectified version of the modulated carrier signal to produce an integrated signal having a voltage proportional to an integral of the rectified version of the modulated carrier signal with respect to time; and
   a third circuit coupled to an output of the second circuit and configured and arranged to sample the integrated signal and provide therefrom a sample-based approximation of the modulated carrier signal.

2. The apparatus of claim 1, wherein
   the integrated signal has a voltage proportional to a sum of the amplitude of the modulated carrier signal over a time period; and
   the modulated carrier signal is an amplitude-shift-key (ASK) modulated signal.

3. The apparatus of claim 1, further including a smart card that includes the second circuit, wherein the first circuit is also configured and arranged to generate the first clock signal, the first clock signal is developed from the modulated carrier signal, and the second circuit is further configured and arranged to provide a signal dump operation in response to a second clock signal, the second clock signal having a frequency equal to a frequency of the first clock signal.

4. The apparatus of claim 1, wherein the first circuit includes a sub-circuit configured and arranged to generate the first clock signal from the modulated carrier signal, the sub-circuit including:
   a differential to single-ended buffer having first and second inputs respectively coupled to first and second ends of the antenna; and
   a frequency divider circuit coupled to an output of the differential to single-ended buffer and configured and arranged to reduce a frequency of a signal output from the differential to single-ended buffer by a factor of N, where N>1, an output of the frequency divider circuit providing the first clock signal.

5. The apparatus of claim 1, wherein the second circuit is further configured and arranged to provide a signal dump operation for the integration performed by the second circuit in response to a second clock signal, the second clock signal having a frequency equal to a frequency of the first clock signal.

6. The apparatus of claim 1, wherein the second circuit is further configured and arranged to provide a signal dump operation for the integration performed by the second circuit by resetting the integration performed by the second circuit, in response to a second clock signal, the second clock signal having a frequency equal to a frequency of the first clock signal.

7. The apparatus of claim 1, wherein the second circuit is further configured and arranged to provide a signal dump operation for the integration performed by the second circuit by at least partially erasing signal buildup within the second circuit due to the integration performed by the second circuit.

8. The apparatus of claim 1, further including a smart card that includes each of the first circuit, the second circuit and the third circuit, wherein the third circuit is configured and arranged to sample the integrated signal in response to a third clock signal.

9. The apparatus of claim 1, further including a smart card that includes each of the first circuit, the second circuit and the third circuit, wherein the third circuit is configured and arranged to convert analog samples of the integrated signal to digital values.

10. The apparatus of claim 1, further including a smart card that includes the antenna, the first circuit, the second circuit and the third circuit.

11. The apparatus of claim 1, wherein the integration is performed by a circuit having a frequency-domain transfer function that is inversely proportional to a frequency of the rectified version of the modulated carrier signal.

12. The apparatus of claim 1, wherein
    the modulated carrier signal is an amplitude modulated signal; and
    the first clock signal has a frequency and phase configured to cause the second circuit to integrate portions of the rectified version of the modulated carrier signal corresponding to peaks of the amplitude modulated signal.

13. The apparatus of claim 1, wherein the first circuit, the second circuit and the third circuit are collectively configured and arranged to provide the sample-based approximation of the modulated carrier signal without providing either a phase-locked loop or a delay-locked loop operation.

14. The apparatus of claim 1, wherein the first circuit, the second circuit and the third circuit are collectively configured and arranged to provide the sample-based approximation of the modulated carrier signal without providing a low-pass filtering operation.

15. A method comprising:
    using a first circuit, providing a modulated carrier signal received from an antenna to a second circuit, the modulated carrier signal conveying data using peaks or amplitudes of the carrier signal;
    using the second circuit, processing the modulated carrier signal, in response to a first clock signal, by providing a rectified version of the modulated carrier signal and by performing an integration of the rectified version of the modulated carrier signal to produce an integrated signal having a voltage proportional to an integral of the rectified version of the modulated carrier signal with respect to time; and
    using a third circuit, sampling the integrated signal and providing therefrom a sample-based approximation of the modulated carrier signal.

16. The method of claim 15, wherein the modulated carrier signal is an amplitude modulated signal; and
    further comprising:
    using the first circuit, dividing a frequency of the modulated signal by a dividend to produce the first clock signal, the first clock signal indicating portions of the rectified version of the modulated carrier signal corresponding to peaks of the amplitude modulated signal; and
    using the third circuit, in response to a second clock signal, the second clock signal having a frequency equal to a frequency of the first clock signal, performing a signal dump operation that resets the integration of the rectified version of the modulated carrier signal.

17. The method of claim 15, further comprising using the third circuit to convert analog samples of the integrated signal to digital values, and wherein the integration is performed by a circuit having a frequency-domain transfer function that is inversely proportional to a frequency of the rectified version of the modulated carrier signal.

18. An apparatus comprising:
a first means for providing a modulated carrier signal received from an antenna to a second means, the modulated carrier signal conveying data using peaks or amplitudes of the carrier signal;
a second means for processing the modulated carrier signal, in response to a first clock signal, by providing a rectified version of the modulated carrier signal and by performing an integration of the rectified version of the modulated carrier signal to produce an integrated signal having a voltage proportional to an integral of the rectified version of the modulated carrier signal with respect to time; and
a third means for sampling the integrated signal and providing therefrom a sample-based approximation of the modulated carrier signal.

19. The apparatus of claim 18, wherein
the modulated carrier signal is an amplitude modulated signal; and
the first clock signal has a frequency and phase configured to cause the second means to integrate portions of the rectified version of the modulated carrier signal corresponding to peaks of the amplitude modulated signal.

20. The apparatus of claim 18, wherein the first means, the second means and the third means are collectively configured and arranged to provide the sample-based approximation of the modulated carrier signal without providing either a phase-locked loop or a delay-locked loop operation.

* * * * *